W. J. Horton.
Cotton Gin.
Nº 92,724.   Patented Jul. 20. 1869.
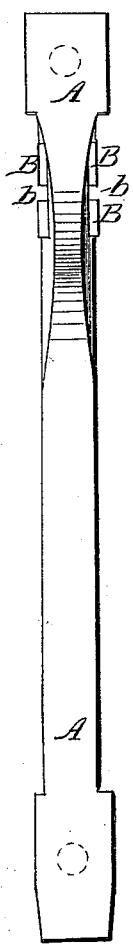
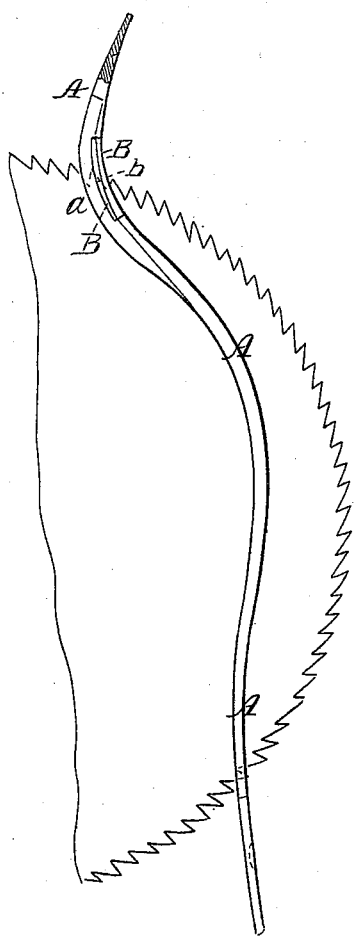

UNITED STATES PATENT OFFICE.

W. J. HORTON, OF NEWBURG, ASSIGNOR TO HIMSELF, AND JOHN S. NAPIER, OF MOUNT HOPE, ALABAMA.

IMPROVEMENT IN COTTON-GIN RIBS.

Specification forming part of Letters Patent No. 92,724, dated July 20, 1869.

*To all whom it may concern:*

Be it known that I, WILLIAM J. HORTON, of Newburg, in the county of Franklin and State of Alabama, have invented a new and useful Improvement in Cotton-Gin Ribs; and I do hereby declare that the following is a full, clear, and exact description thereof, which will enable others skilled in the art to make and use the same, reference being had to the accompanying drawings, forming part of this specification, in which—

Figure 1 represents a face view of my improved cotton-gin rib. Fig. 2 is an edge view, partly in section, of the same.

Similar letters of reference indicate corresponding parts.

This invention relates to certain improvements in the ribs of cotton-gin grids, and has for its object to prevent the injury of the fiber and a proper action of the saws.

The invention consists, chiefly, in providing the rib with a notched plate, whereby it is made more efficient and reliable, as hereinafter more fully described.

The rib A differs from those in general use by being made narrower at the point $a$ where the teeth of the saw pass it, and by being provided with a transversely-projecting steel plate, B, which is inserted in a groove on the inner face of the rib, and fastened by suitable means. A notch or recess, $b$, is formed on each side of the plate B, to allow the lint or fiber to pass through freely without being cut or injured, as on all ordinary gins. The plate B is tapering, so as to be wider at the lower end, to prevent the saw from coming in contact with the rib in case the saw should vibrate. Each of the recesses $b$ should be as long as one of the saw-teeth, so that the points may be in line with the upper edges when the bosses are in line with the lower edges of the recesses, to facilitate the passage of the fiber.

Having thus described my invention, what I claim as new, and desire to secure by Letters Patent, is—

The cotton-gin rib provided with a plate, B, which has a recess, $b$, on each side, substantially as and for the purpose herein shown and described.

W. J. HORTON.

Witnesses:
 JESSE HURLEY,
 CHAS. P. BANKS.